US006798440B2

(12) United States Patent
Yasuda

(10) Patent No.: US 6,798,440 B2
(45) Date of Patent: Sep. 28, 2004

(54) IMAGE RECORDING APPARATUS

(75) Inventor: Hiroaki Yasuda, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 68 days.

(21) Appl. No.: 10/352,072

(22) Filed: Jan. 28, 2003

(65) Prior Publication Data

US 2003/0142196 A1 Jul. 31, 2003

(30) Foreign Application Priority Data

Jan. 30, 2002 (JP) ....................................... 2002-021283

(51) Int. Cl.[7] ............................ G02B 6/00; B41J 2/435; B41J 2/447

(52) U.S. Cl. ........................................ 347/244; 347/258

(58) Field of Search ................................. 347/256, 258, 347/241, 244

(56) References Cited

U.S. PATENT DOCUMENTS 6,542,178 B2 * 4/2003 Miyagawa et al. ......... 347/256

FOREIGN PATENT DOCUMENTS

EP 0 887 192 12/1998

* cited by examiner

*Primary Examiner*—Huan Tran
(74) *Attorney, Agent, or Firm*—Sughrue Mion, PLLC

(57) ABSTRACT

An image recording apparatus has light emitting elements arranged in a main scanning direction and an imaging optical system which images light from the light emitting elements on a recording medium. An image is recorded on the recording medium by imaging light from the light emitting elements through the imaging optical system while moving the recording medium in a sub-scanning direction. The imaging optical system is formed of a first optical system consisting of biaxial optical elements, each having a refractive index profile in the main scanning direction and a refractive index in the sub-scanning direction, arranged in the main scanning direction, and a second optical system consisting of an optical element disposed on the light incident side of the first optical system and having a refractive power to light components propagated in the sub-scanning direction but no refractive power to light components propagated in the main scanning direction.

16 Claims, 14 Drawing Sheets

IMAGE RECORDING APPARATUS

BACKGROUND OF THE INVENTION

1. Field of the Invention

This invention relates to an image recording apparatus, and more particularly to an image recording apparatus for recording a two-dimensional image on a two-dimensional recording medium by imaging thereon light emitted from a plurality of light emitting elements arranged in one direction.

2. Description of the Related Art

There has been known a line recording type image recording apparatus which comprises a line recording source comprising a number of light emitting elements linearly arranged in a main scanning direction and an erecting unit optical system comprising a refractive index distribution type lens array which images light emitted from the line recording source as an erected image in an unit magnification on a two-dimensional recording medium and in which a two-dimensional image is recorded on the two-dimensional recording medium by imaging light emitted from the respective light emitting elements of the line recording source, the intensity of light emitted from the respective light emitting elements being modulated according to the image to be recorded, through the refractive index distribution type lens array while moving the two-dimensional recording medium in a sub-scanning direction intersecting the aforesaid main scanning direction. See, for instance, U.S. patent application No. 882763(1997).

The degree of freedom of the refractive index profile of the refractive index distribution type lens array is limited for reasons of production and it is difficult to obtain a refractive index distribution type lens array having a desired resolution and a large numerical aperture. Accordingly, the part of the light emitted from the light emitting elements which does not impinge upon the refractive index distribution type lens array within the range of a predetermined numerical aperture is absorbed or reflected at the side face of the lens array and cannot be imaged on the two-dimensional recording medium. That is, a part of the light emitted from the light emitting elements cannot be used for forming an image on the two-dimensional recording medium and is emitted in vain. Especially, in a dry printer where a heat-developing film is used and a large amount of heat energy is used to heat-develop the film, there has been a demand that the light emitted from the light emitting elements is better used to reduce the power consumption and the light emitting element cost.

SUMMARY OF THE INVENTION

In view of the foregoing observations and description, the primary object of the present invention is to provide an image recording apparatus which can better use the light emitted from the light emitting elements to record the image.

In accordance with the present invention, there is provided an image recording apparatus which comprises a plurality of light emitting elements arranged in a main scanning direction and an imaging optical system which images light emitted from the light emitting elements on a two-dimensional recording medium in a linearly arranged fashion and in which a two-dimensional image is recorded on the two-dimensional recording medium by imaging light emitted from the respective light emitting elements, the intensity of light emitted from the respective light emitting elements being modulated according to the image to be recorded, through the imaging optical system while moving the two-dimensional recording medium in a sub-scanning direction relatively to the imaging optical system, wherein the improvement comprises that the imaging optical system comprises a first optical system comprising a plurality of biaxial optical elements, each having a refractive index profile in the main scanning direction and a refractive index in a direction perpendicular to the main scanning direction, arranged in the main scanning direction, and a second optical system comprising an optical element disposed on the light incident side of the first optical system or on each of the light incident side and the imaging side of the first optical system and having a refractive power to light components propagated in a direction perpendicular to the main scanning direction but no refractive power to light components propagated in the main scanning direction.

The imaging optical system may be, for instance, an optical system which images light emitted from the light emitting elements as an erected image in an unit magnification on the two-dimensional recording medium.

It is preferred that the first and second optical systems be formed integrally with each other.

The two-dimensional recording medium may be, for instance, a heat-developing film.

The light emitting element may be selected from the group consisting of an LED element, an LD element and an organic EL element.

The sub-scanning direction need not be perpendicular to the main scanning direction so long as it intersects the main scanning direction.

The two-dimensional recording medium need not be in the form of a flat sheet but may be a recording medium having a curved recording surface such as a cylindrical surface. That is, the two-dimensional image may be recorded on a curved surface as well as a flat surface.

In the image recording apparatus of the present invention, the collecting efficiency of the light components propagated in a direction perpendicular to the main scanning direction can be increased without deteriorating the resolution since the numerical aperture (NA) in the direction perpendicular to the main scanning direction can be increased by virtue of the second optical system having a refractive power to light components propagated in a direction perpendicular to the main scanning direction but no refractive power to light components propagated in the main scanning direction irrespective of limitation in the degree of freedom of the refractive index profile of the first optical system, whereby the light emitted from the light emitting elements can be better used to record the image.

When the imaging optical system is an optical system which images light emitted from the light emitting elements as an erected image in an unit magnification on the two-dimensional recording medium, the image represented by the intensities of the light emitted from the respective light emitting elements can be more precisely formed on the two-dimensional medium.

When the first and second optical systems are formed integrally with each other, the optical system holding mechanism can be simplified and the imaging optical system can be small in size. At the same time, shift of each optical system relatively to the other optical system due to vibration or the like can be suppressed, whereby the optical performance of the imaging optical system can be held constant for a long time. Further, when the light emitting element is an LED element, an LD element or an organic EL element, the image recording apparatus can be smaller in size.

The present invention is especially useful when it is applied to an image recording apparatus, where the two-dimensional recording medium is a heat-developing film requiring a large amount of optical energy.

DESCRIPTION OF THE PREFERRED EMBODIMENT

Figure 1:
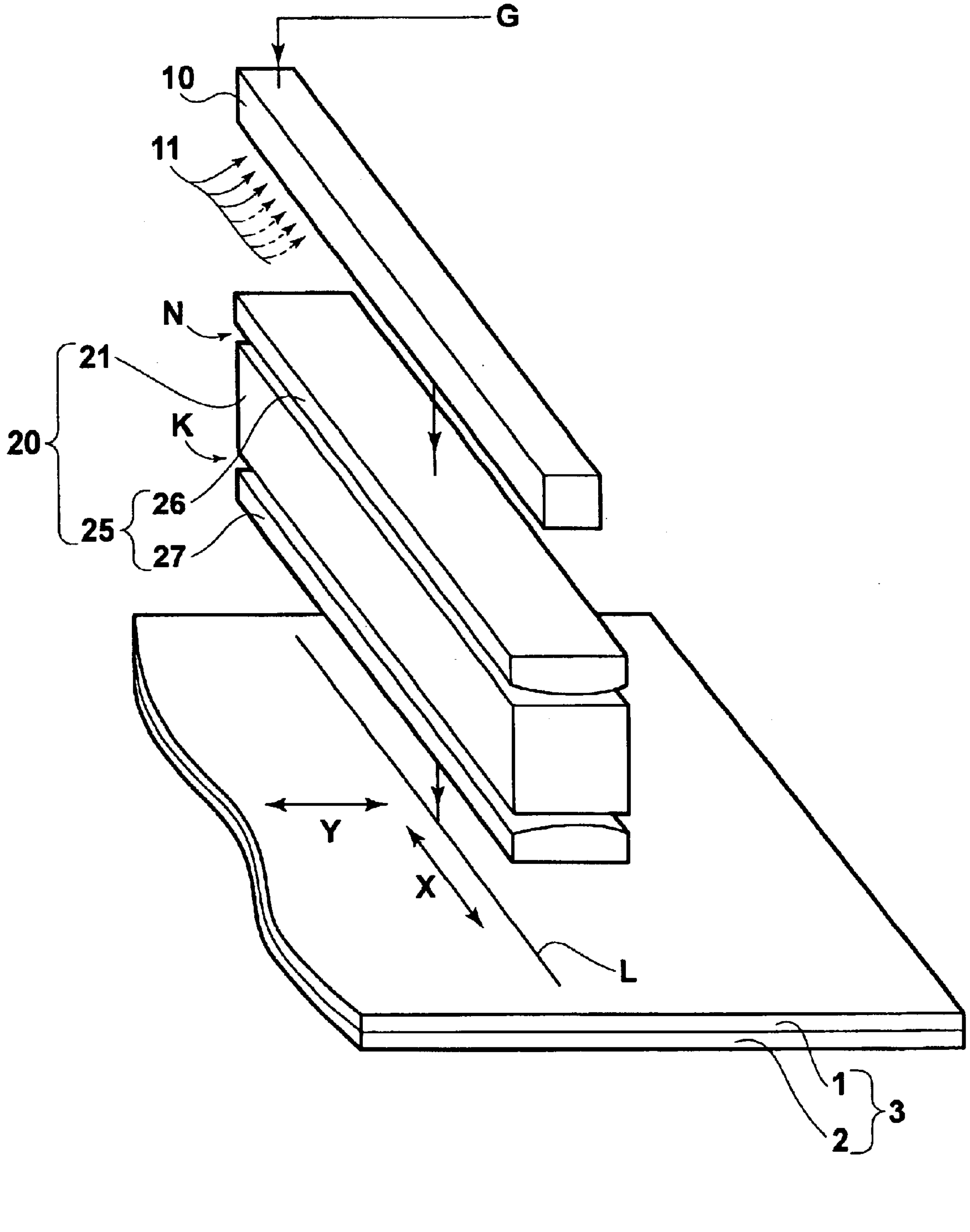
FIG. 1 is a perspective view showing an image recording apparatus in accordance with a first embodiment of the present invention.
Figure 2:
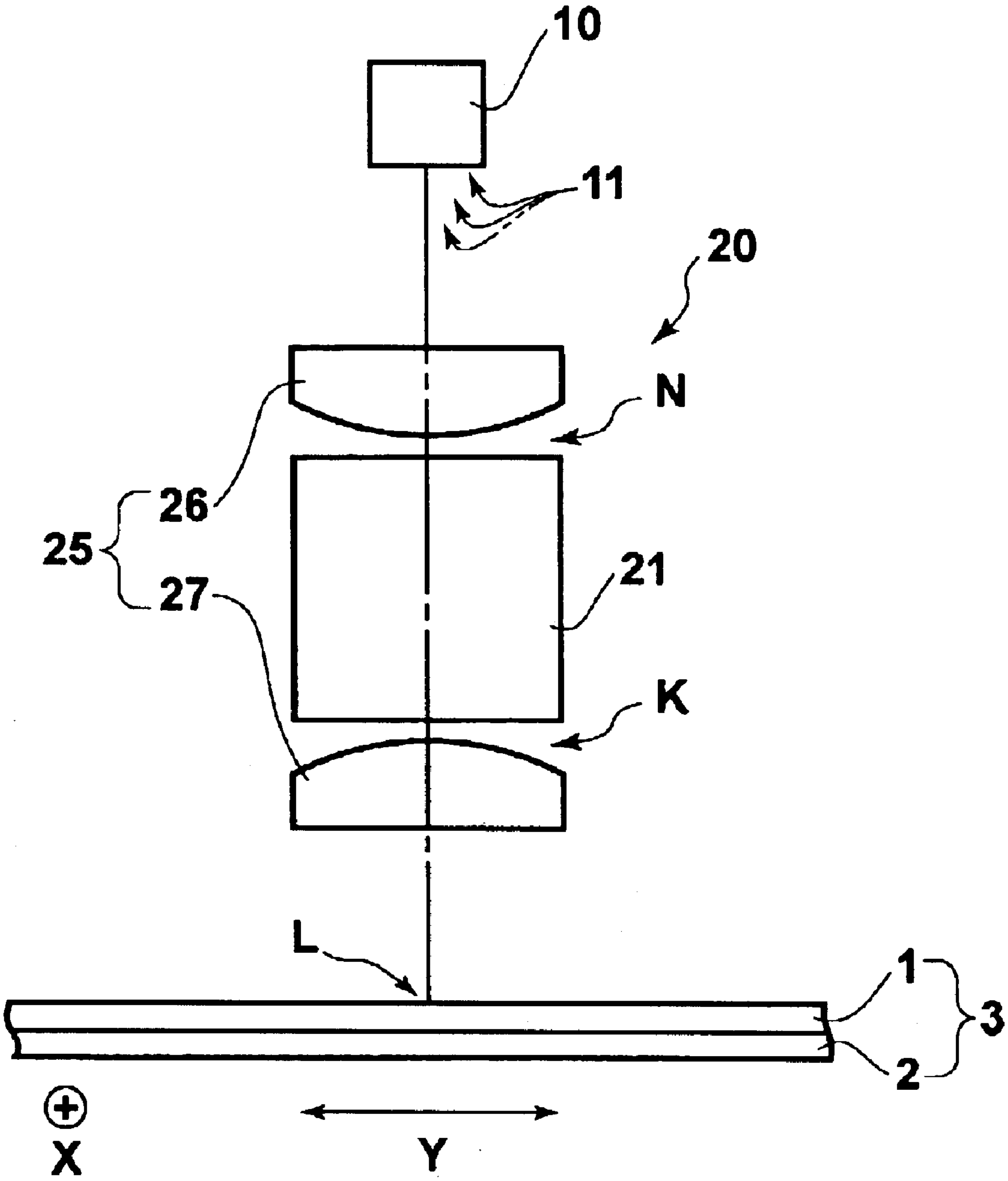
FIG. 2 is a side view of the image recording apparatus.

In FIGS. 1 and 2, an image recording apparatus in accordance with a first embodiment of the present invention comprises a line light source 10 including a plurality of light emitting elements (organic EL elements in this particular embodiment) 11 arranged in a main scanning direction X (the direction shown by the arrow X in FIGS. 1 and 2) and an imaging optical system 20 which images the lights emitted from the respective light emitting elements 11 in a linearly arranged fashion on a two-dimensional recording medium 1. The image recording apparatus records a two-dimensional image L represented by the intensities of lights emitted from the respective light emitting elements 11 on the two-dimensional recording medium 1 by imaging lights emitted from the respective light emitting elements 11 through the imaging optical system 20 while conveying the two-dimensional recording medium 1 in a sub-scanning direction Y perpendicular to the main scanning direction X.

The imaging optical system 20 comprises a first optical system 21 comprising a plurality of biaxial optical elements 22, each having a refractive index profile in the main scanning direction X and a refractive index in a direction perpendicular to the main scanning direction X, arranged in the main scanning direction X, and a second optical system 25 comprising an optical element disposed on each of the light incident side N and the imaging side K of the first optical system 21 and has a refractive power to light components propagated in a direction perpendicular to the main scanning direction X but no refractive power to light components propagated in the main scanning direction X, and images lights emitted from the light emitting elements 11 as an erected image in an unit magnification on the two-dimensional recording medium 1.

Figure 3:
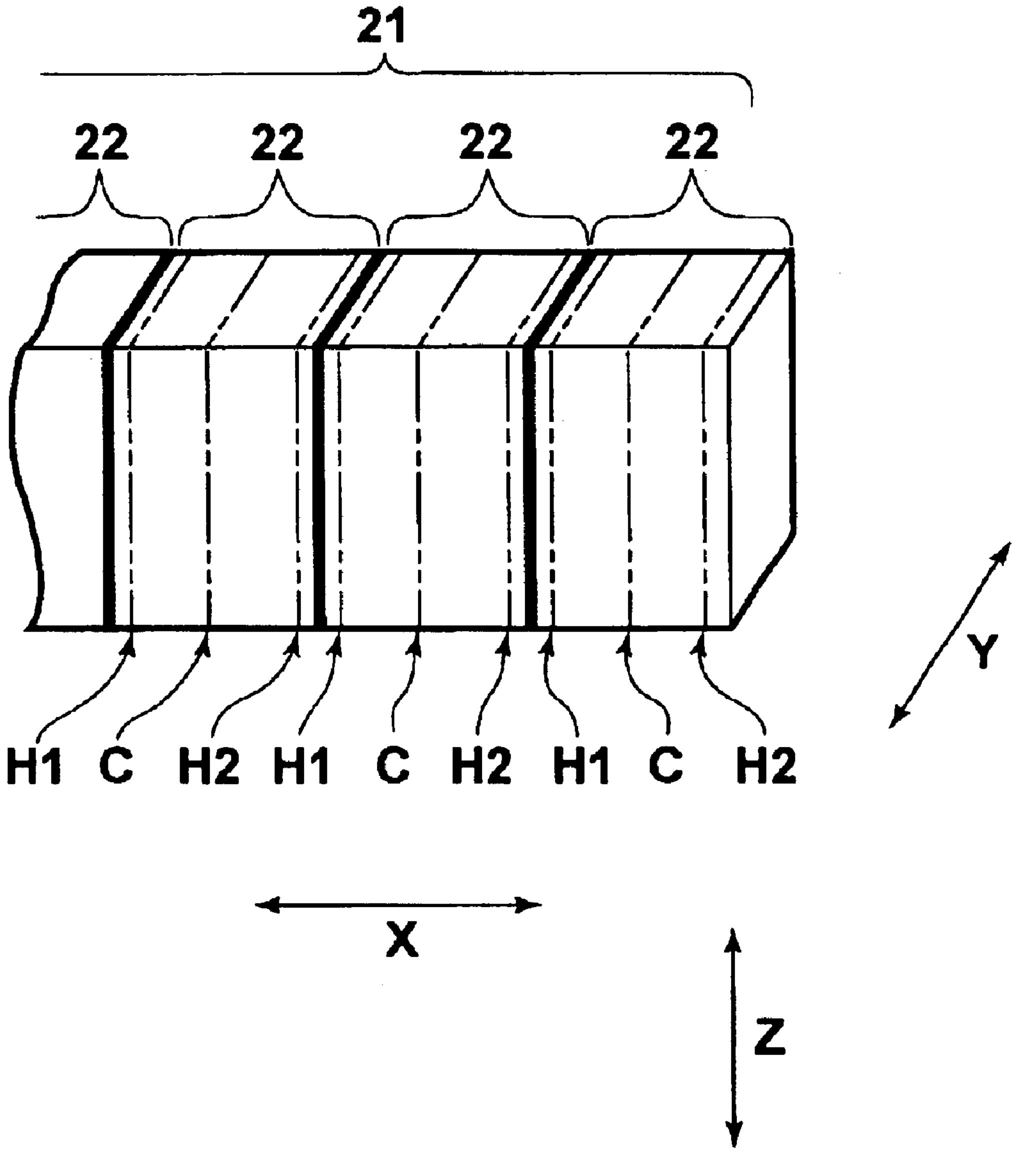
FIG. 3 is a fragmentary perspective view of the first optical system employed in the image recording apparatus.

As shown in FIG. 3, each biaxial optical element 22 of the first optical system 21 is a rectangular parallelepiped in shape and ha a refractive index profile where the refractive index is the largest at the middle in the main scanning direction X and gradually becomes smaller toward the ends H1 and H2 in the main scanning direction X. Each biaxial optical element 22 has a constant refractive index in a direction perpendicular to the main scanning direction X (that is, in a direction of the plane including the sub-scanning direction Y and the Z direction (the direction of arrow Z) perpendicular to the sub-scanning direction Y).

The second optical system 25 comprises an incident side cylindrical lens 26 which is disposed on the light incident side N of the first optical system 21 and an imaging side cylindrical lens 27 which is disposed on the imaging side K of the first optical system 21.

Figure 4B:
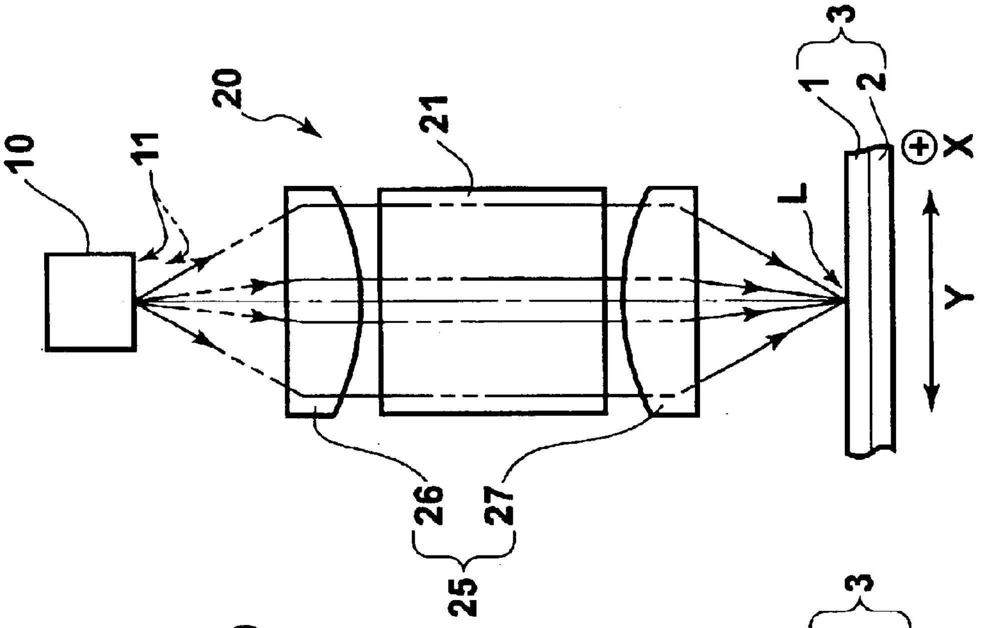
FIGS. 4A and 4B are respectively a front view and a side view showing the manner in which the light emitted from the light emitting element is imaged on the two-dimensional recording medium through the imaging optical system.
Figure 4A:
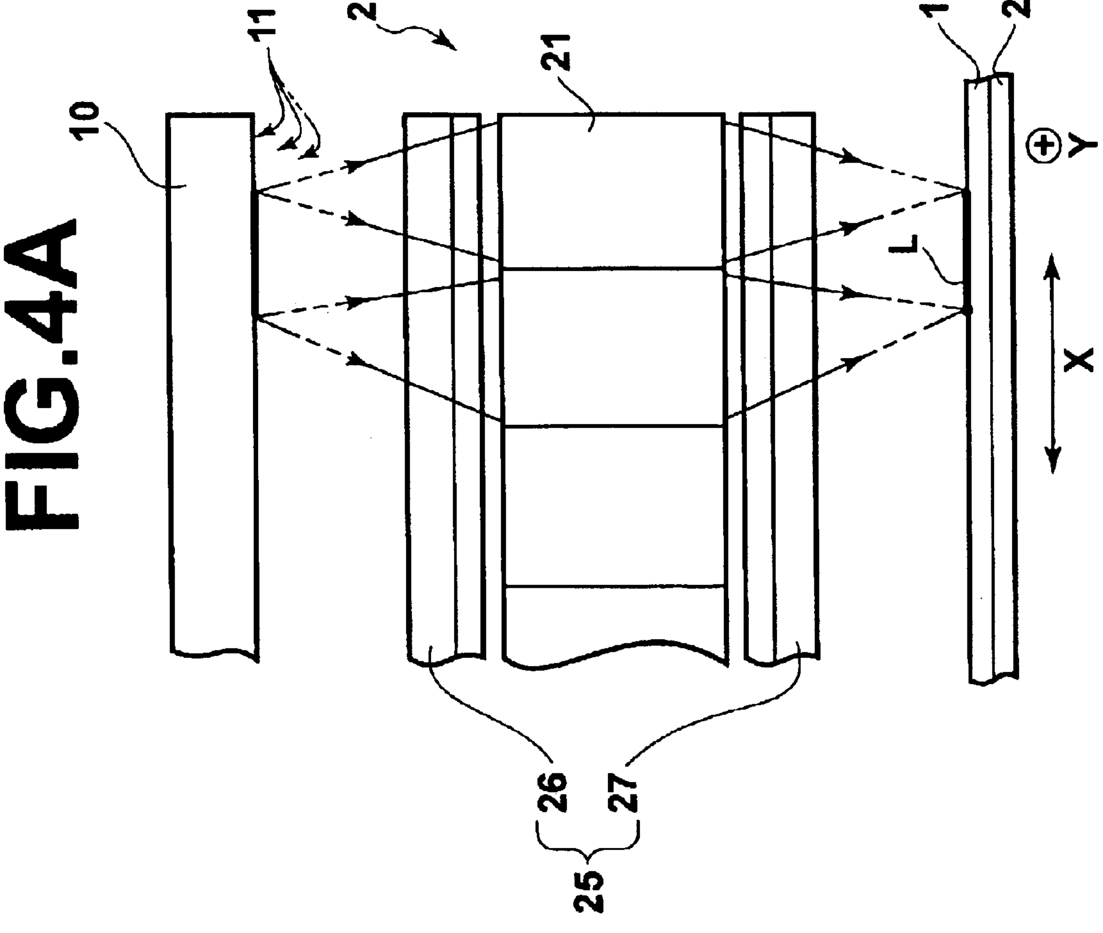

The two-dimensional recording medium 1 is a heat-developing film, and ink of the two-dimensional recording medium 1 on the parts corresponding to the image L formed on the recording medium 1 is transferred to a transfer paper 2 (FIGS. 4A and 4B) in close contact with the two-dimensional recording medium (heat-developing film) 1, whereby the image L is printed on the transfer paper. The two-dimensional recording medium 1 together with the transfer paper 2 in close contact therewith will be referred to as "the print sheet 3", hereinbelow. When a two-dimensional image is recorded, the print sheet 3 is in conveyed in the sub-scanning direction Y perpendicular to the main scanning direction X.

The operation of the image recording apparatus of the first embodiment will be described, hereinbelow.

The light emitting elements 11 are energized according to an image signal G sent to the line source 11 from, for instance, an image read-out apparatus, which reads a radiation image recorded on a stimulable phosphor sheet, while conveying the print sheet 3 in the sub-scanning direction Y relatively to the imaging optical system 20, thereby imaging a two-dimensional image L represented by the intensities of lights emitted from the respective light emitting elements 11 on the two-dimensional recording medium 1 of the print sheet 3.

The two-dimensional image L imaged on two-dimensional recording medium 1 of the print sheet 3 is heat-transferred to the transfer paper 2 of the print sheet 3 from the two-dimensional recording medium 1 and is printed on the transfer paper 2. Thereafter, the transfer paper 2 is peeled off the two-dimensional recording medium 1, and the transfer paper 2 printed thereon with the two-dimensional image L is used by itself.

Imaging in the main scanning direction X by the imaging optical system 20 will be described first, hereinbelow.

Since having no refractive power to light components propagated in the main scanning direction X perpendicular to the sub-scanning direction Y (having no power to converge or diverge a light bundle in the main scanning direction X perpendicular to the sub-scanning direction Y), the second optical system 25 comprising the cylindrical lenses 26 and 27 may be regarded as a plane-parallel plate when transmitting light components propagated in the main scanning direction X (perpendicular to the sub-scanning direction Y). Accordingly, light emitted from each light emitting elements 11 and propagated in the main scanning direction X is converged in the main scanning direction X only by the refractive power of the first optical system 21 and imaged on the two-dimensional recording medium 1. (See FIG. 4A seen in the sub-scanning direction). That is, the two-dimensional image L represented by the intensities of lights emitted from the respective light emitting elements 11 is imaged on the two-dimensional recording medium 1 as an erected image in an unit magnification in the main scanning direction X.

Imaging in the sub-scanning direction Y by the imaging optical system 20 will be described, hereinbelow.

Since having a constant refractive index in a direction perpendicular to the main scanning direction, the first optical system 21 may be regarded as a plane-parallel plate when transmitting light components propagated in a direction perpendicular to the main scanning direction X. Accordingly, light emitted from each light emitting elements 11 and propagated in the direction perpendicular to the main scanning direction X is converged in the s-scanning direction Y only by the refractive power of the cylindrical lenses 26 and 27 and imaged on the two-dimensional recording medium 1. (See FIG. 4B seen in the main scanning direction). That is, the two-dimensional image L represented by the intensities of lights emitted from the respective light emitting elements 11 is imaged on the two-dimensional recording medium 1 as an erected image in an unit magnification in the main scanning direction X.

Figure 5B:
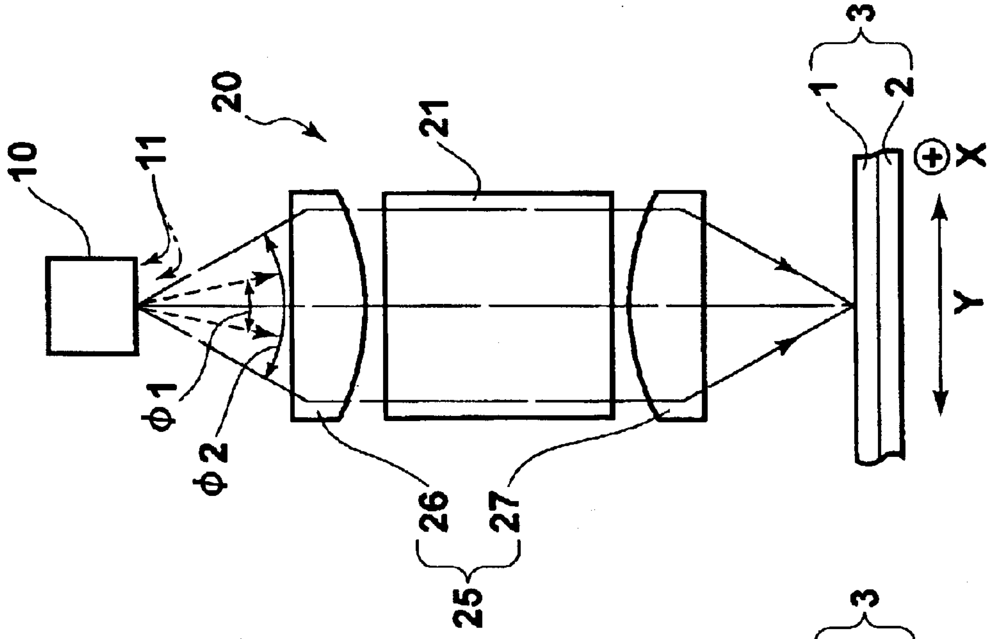
FIGS. 5A and 5B are respectively a front view and a side view showing the difference between the light collecting efficiency in the main scanning direction and that in the sub-scanning direction.
Figure 5A:
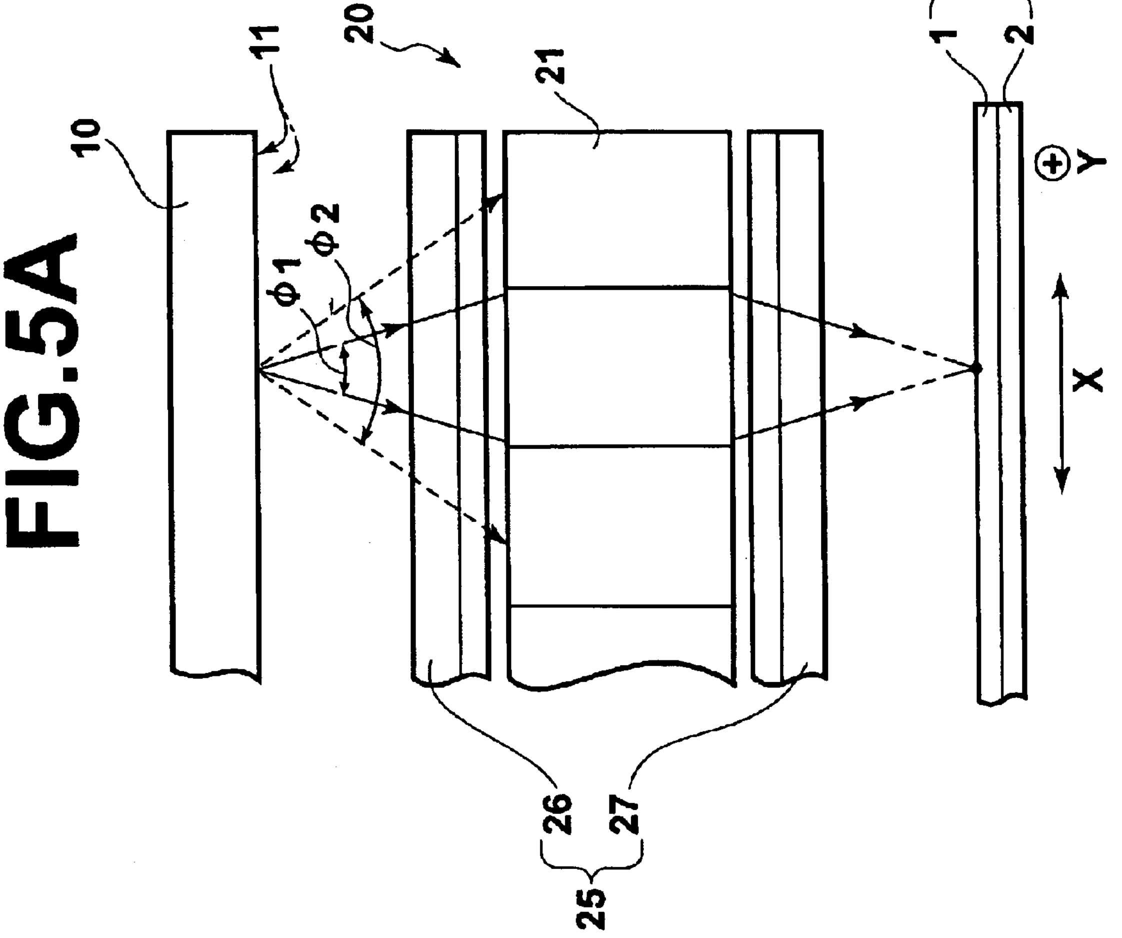

The bundle Φ1 of the light emitted from the respective light emitting elements 11 which can contribute to imaging in the main scanning direction X is limited by the incident side numerical aperture (U1) of the first optical system 21 as can be seen from FIG. 5A, whereas the bundle Φ2 of the light emitted from the respective light emitting elements 11 which can contribute to imaging in the sub-scanning direction Y is limited by the incident side numerical aperture (U2) of the second optical system 25 (the cylindrical lenses 26 and 27) as can be seen from FIG. 5B. In the imaging optical system 20, though the numerical aperture of the first optical system 21, having a refractive index profile, is limited for reasons of production, the numerical aperture of the second optical system 25 is free from such a limitation. Accordingly, the numerical aperture U2 of the second optical system 25 may be larger than that U1 of the first optical system 21 (U2>U1, Φ2>Φ1), and the light collecting efficiency in the sub-scanning direction Y can be increased as compared with an optical system solely consisting of a refractive index distribution type lens array, whereby the light collecting efficiency in the sub-scanning direction Y can be increased without deteriorating the resolution and the light emitted from the light emitting elements 11 can be better used to record the image.

Instead of the cylindrical lenses, the second optical element 25 may comprise an aspheric cylindrical lens which is smaller than the cylindrical lens in spherical aberration. The aspheric component for reducing the spherical aberration may comprise a Fresnel lens or an interference lens of other types.

Figure 6:
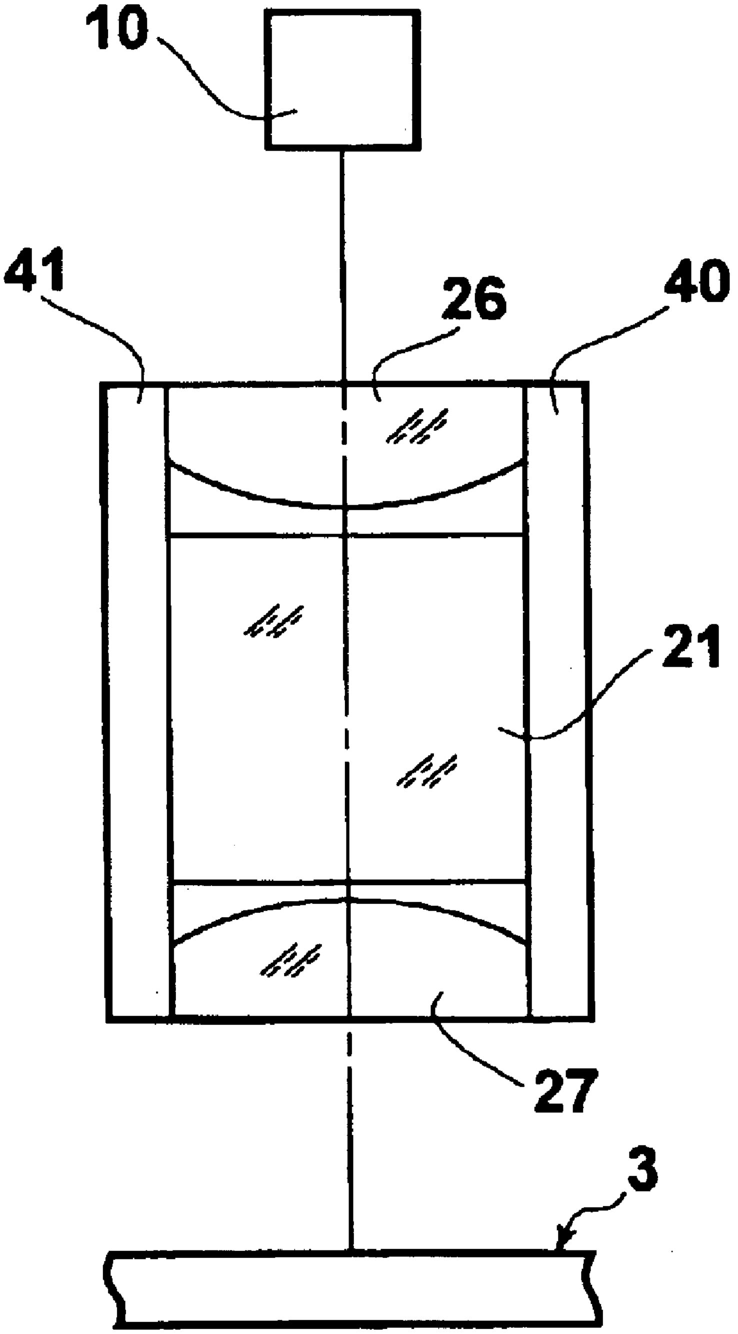
FIG. 6 is side view showing a modification of the imaging optical system employed in the image recording apparatus of the first embodiment.

The first optical system 21 and the second optical system 25 may be integrated by a pair of side plates 40 and 41 as shown in FIG. 6.

Figure 7B:
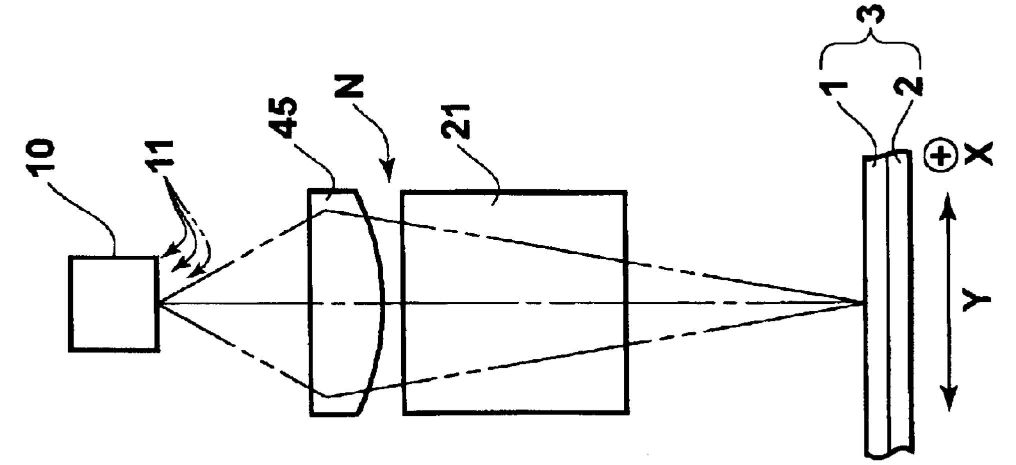
FIGS. 7A and 7B are respectively a front view and a side view showing a modification of the second optical system.
Figure 7A:
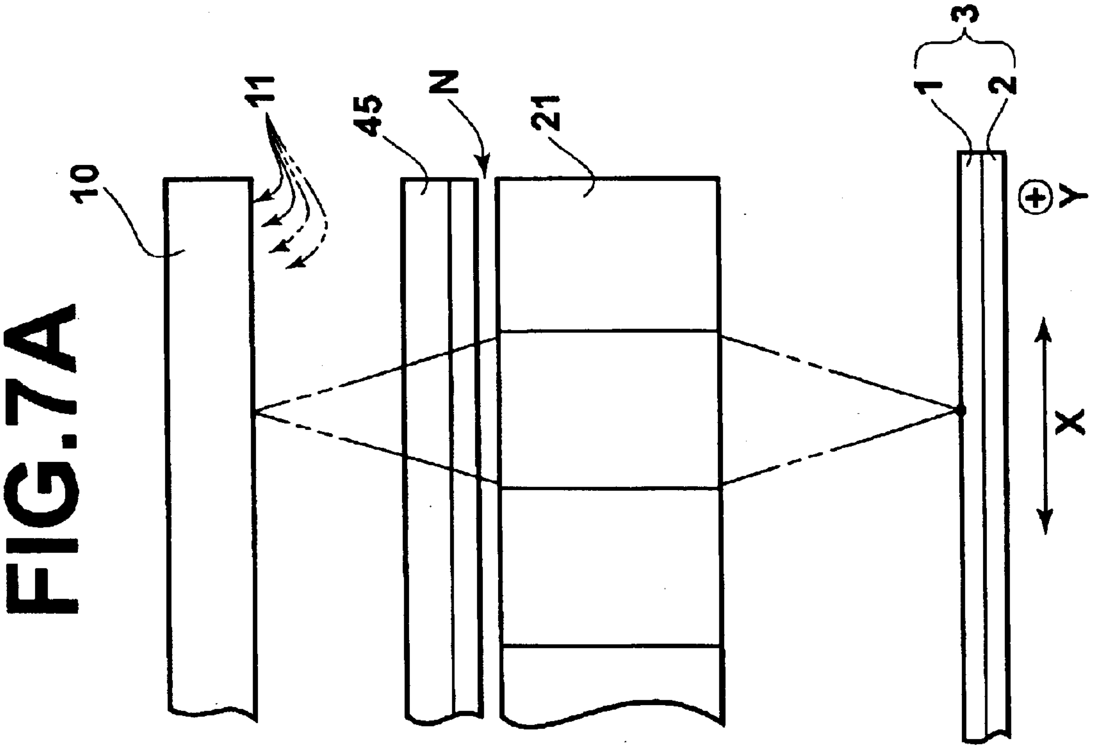

The second optical system may comprise only a single cylindrical lens 45 disposed on the incident side N of the first optical system 21 as shown in FIGS. 7A and 7B.

The second optical system 25 may comprise a Fresnel lens or an interference lens of other types.

The biaxial optical elements may be arranged in the main scanning direction X at pitches larger than, smaller than or equal to that at which the light emitting elements are arranged in the main scanning direction X.

The two-dimensional recording medium may be moved in the sub-scanning direction Y relatively to the imaging optical system either by moving the two-dimensional recording medium in the sub-scanning direction Y with the imaging optical system held stationary, by moving the imaging optical system in the sub-scanning direction Y with the two-dimensional recording medium held stationary or by moving both the imaging optical system and the two-dimensional recording medium in the sub-scanning direction Y. Though, in the first embodiment, the sub-scanning direction Y is perpendicular to the main scanning direction X, the sub-scanning direction Y need not be perpendicular to the main scanning direction X so long as it intersects the main scanning direction X. Even if the sub-scanning direction Y is not perpendicular to the main scanning X, the second optical system should be disposed to have a refractive power to light components propagated in a direction perpendicular to the main scanning direction but no refractive power to light components propagated in the main scanning direction.

The imaging optical system need not be limited to those which form an erected unit image but may be those which form an erected unit image only in the main scanning direction, those which form an erected image only in the main scanning direction, or those which form an inverted image in the sub-scanning direction.

When the imaging optical system is an optical system which forms an erected unit image only in the main scanning direction, the light emitting elements and the parts of the recording medium are in one-to-one correspondence with each other in the main scanning direction within one line, whereby processing of data connection or the like become unnecessary. Further, when the magnification of the imaging optical system in the sub-scanning direction is smaller than 1, the energy density of the recording light can be increased in the sub-scanning direction and the resolution can be improved in the sub-scanning direction.

When the imaging optical system is an optical system which forms an erected image only in the main scanning direction and the magnification in the main scanning direction of which is smaller than 1, the energy density of the recording light can be increased in the main scanning direction and the resolution can be improved in the main scanning direction.

The light emitting element need not be an organic EL element but may be an LED element, an LD element or the like.

Further, as the two-dimensional recording medium, a cylindrical electrostatic drum on which an electrostatic latent image is formed upon exposure to imagewise light may be employed.

An image recording apparatus in accordance with a second embodiment of the present invention will be described, hereinbelow.

Figure 8:
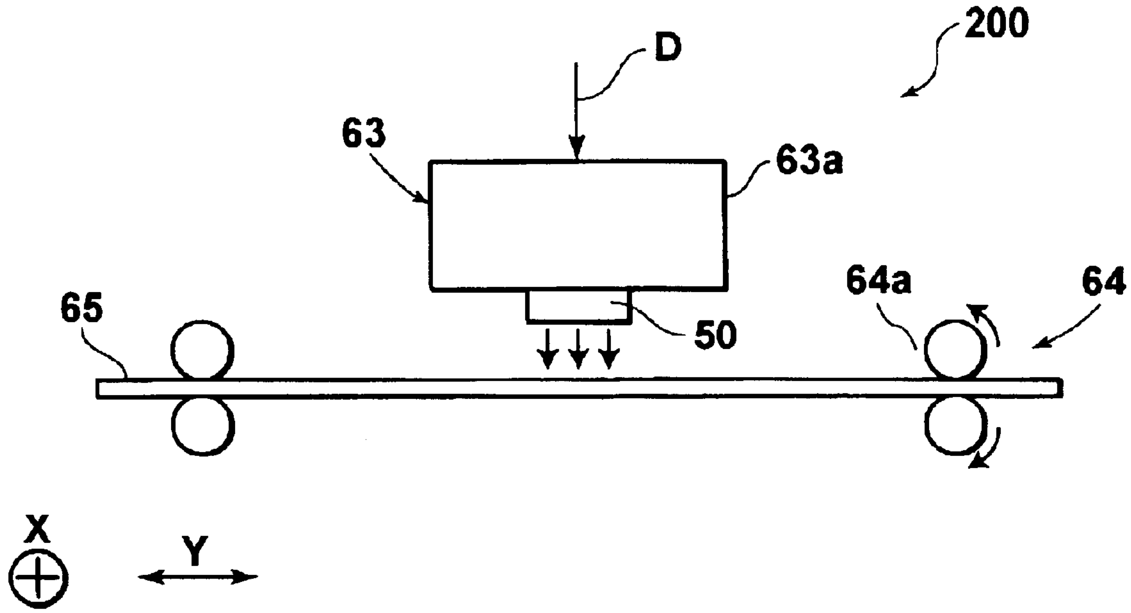
FIG. 8 is a side view showing an image recording apparatus in accordance with a second embodiment of the present invention.
Figure 9:
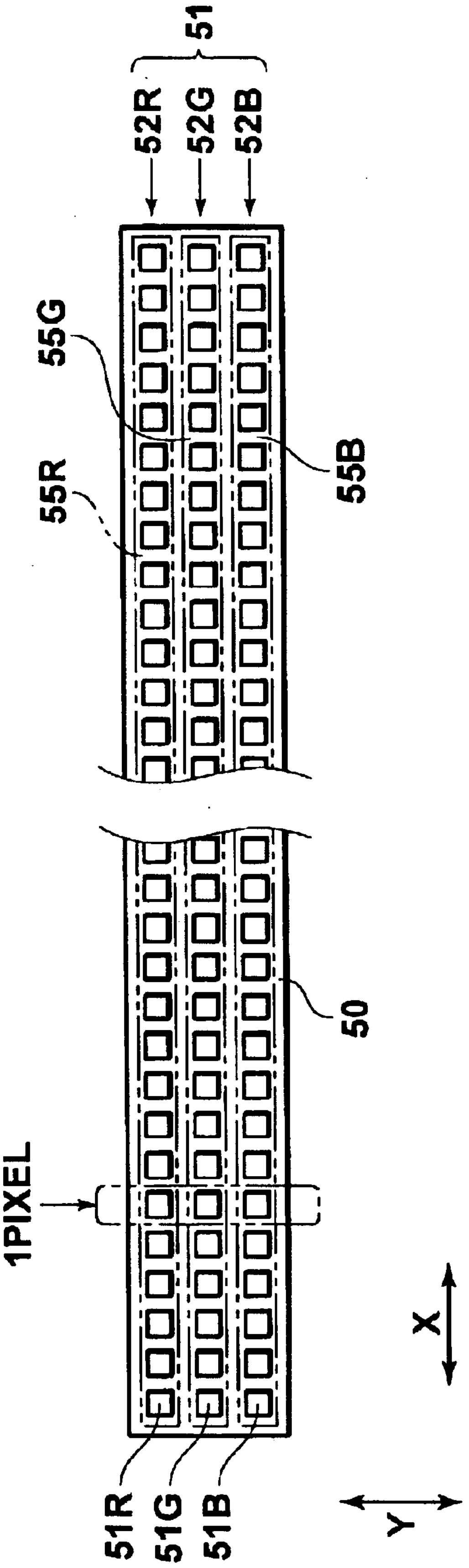
FIG. 9 is an enlarged bottom view showing the multi color light emitting head.

FIGS. 8 and 9 show a color printer 200 as an image recording apparatus in accordance with a second embodiment of the present invention. As shown in FIGS. 8 and 9, the color printer 200 comprises a multi color light emitting head 50 comprising an organic EL element unit 51 extending in a main scanning direction X. The organic EL element unit 51 comprises sub-pixels 51R, 51G and 51B which respectively emit red, green and blue lights and are arranged in a main scanning direction X by colors. The three sub-pixels 51R, 51G and 51B arranged in a sub-scanning direction Y form together with each other one pixel of a color image. In this particular embodiment, the organic EL element unit 51 is produced by forming the sub-pixels 51R, 51G and 51B integrally with each other on a substrate by the use of a semiconductor technique though the sub-pixels 51R, 51G and 51B may be separately formed and joined together. The resolution of the multi color light emitting head 50 is 1200 dpi. Biaxial optical element arrays 55R, 55G and 55B are disposed respectively in front of a plurality of red sub-pixels 51R arranged in the main scanning direction X (will be referred to as "red EL element array 52R", hereinbelow), a plurality of green sub-pixels 51G arranged in the main scanning direction X (will be referred to as "green EL element array 52G", hereinbelow), and a plurality of blue sub-pixels 51B arranged in the main scanning direction X (will be referred to as "blue EL element array 52B", hereinbelow).

The color printer 200 comprises a head portion 63 in which the multi color light emitting head 50 and a driver 53 for selectively energizing the sub-pixels of the head 50 according to an input color image data D are integrally incorporated and a sub-scanning mechanism 64 including four rollers 64*a* which pinch a color photosensitive material 65 and convey the same in the sub-scanning direction Y. The roller 54*a* are driven by an electric motor not shown.

The sub-scanning mechanism 64 may be of any structure so long as it can move the head portion 63 and the photosensitive material 65 relatively to each other in the sub-scanning direction Y.

The color image data D input into the head portion 63 is divided into three color data and once stored in frame memories 70R, 70G and 70B as red, green and blue frame data DF. Then from the frame memories 70R, 70G and 70B, image data corresponding to all the sub-pixels of the EL element unit 51 of the multi color light emitting head 50 is read out to line memories 72R, 72G and 72B. The three pieces of image data read out to the line memories 72R, 72G and 72B are three pieces of line data DL for one line in the sub-scanning direction Y. The three pieces of line data are respectively input into drive circuits 74R, 74G and 74B.

Figure 10:
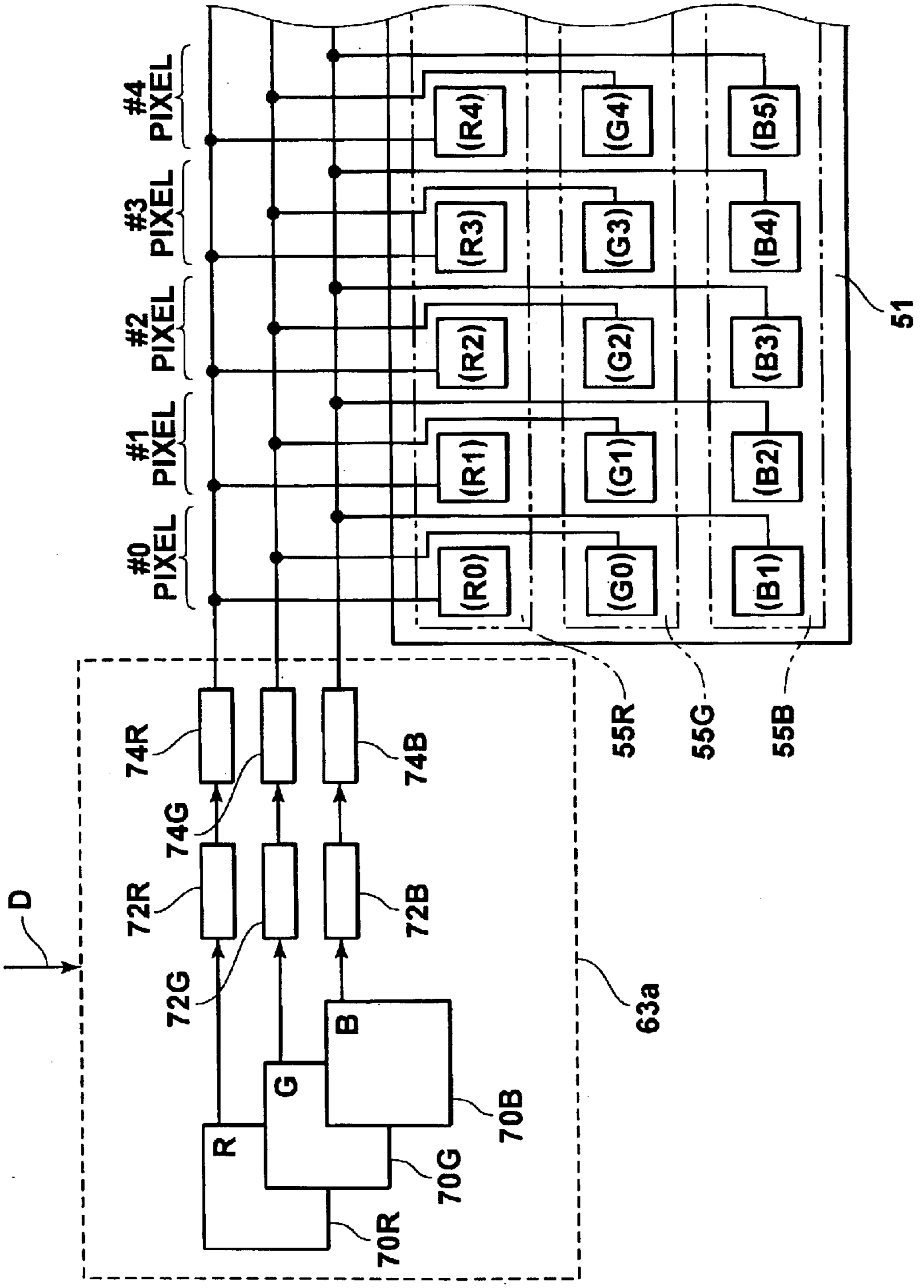
FIG. 10 is a circuit diagram of the head portion for driving the multi color light emitting head.
Figure 11:
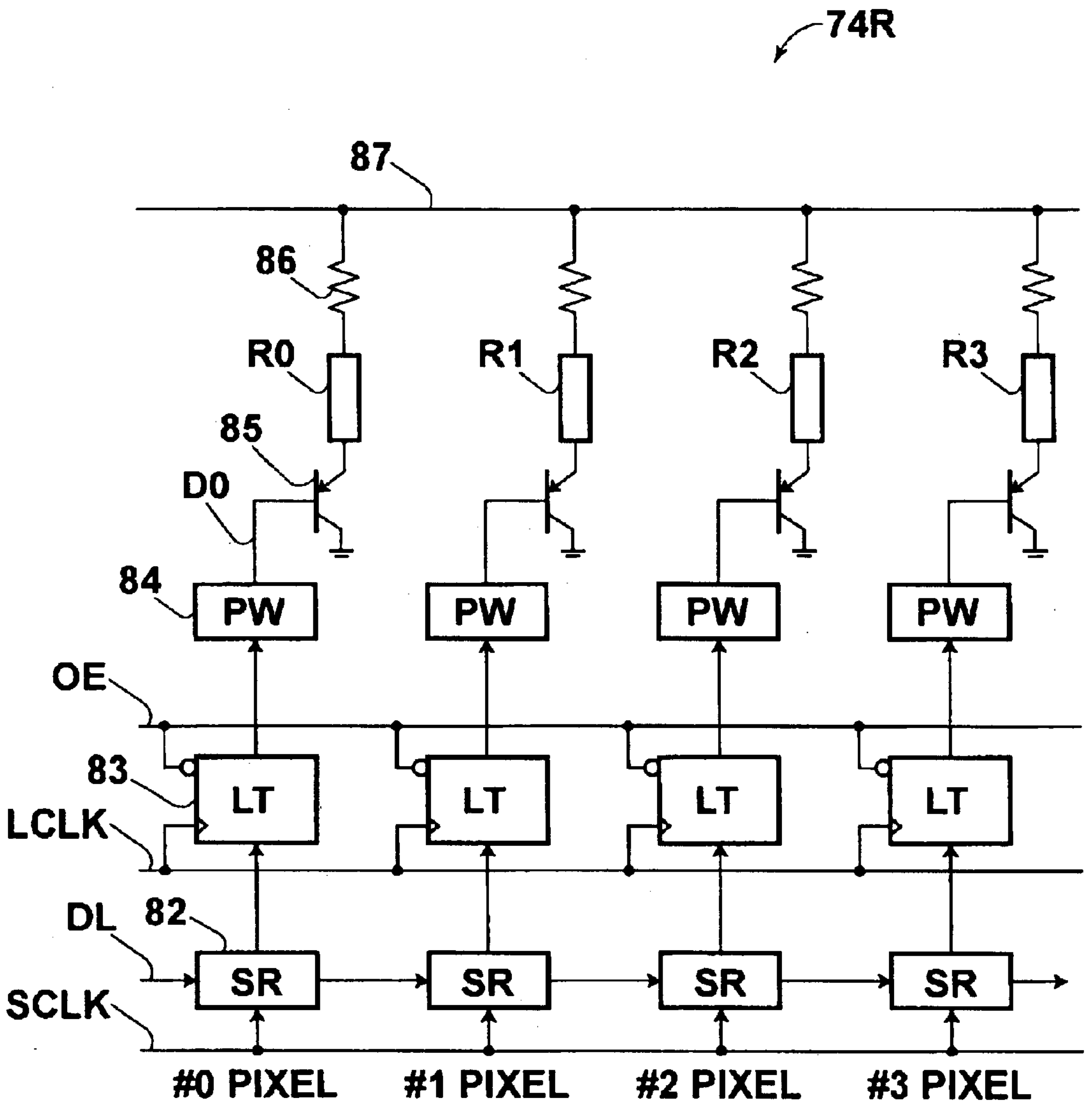
FIG. 11 is a view showing in detail the drive circuit for driving the multi color light emitting head.

The drive circuit 74R will be described with reference to FIG. 11 by way of example. The line data DL input into the drive circuit 74R is in 8 bits and is first input into a shift register (SR) 82 for #0 pixel (FIG. 10) and the data is transferred to the following shift register 82 each time a shift clock SCLK is input until the last shift register 82. Thus, image data for one line is stored in the respective shift registers 82 corresponding to all the sub-pixels 51R of the organic EL element array 52R. In this manner, image data for one line is stored in the respective shift registers 82 corresponding to all the sub-pixels 51R, 51G and 51B of all the organic EL element units 51.

After the line data DL is stored, latch clocks LCLK are input into latches (LT) 83 each connected to one of the shift registers 82, and the line data is held by the latches 83. Thereafter, an output enable signal OE is input into each latch 83 and the line data DL which has been held by the latch 83 is input into a pulse width control circuit (PW) 84.

In each pulse width control circuit 84, the input 8-bit line data DL is converted to an image signal D0 whose pulse width represents the input 8-bit line data DL. The image signal D0 is input into the base of a drive transistor 85 whose collector is grounded. One end of each of the sub-pixels 51R (sub-pixels positioned in R0, R1, R2, R3 . . . in FIG. 10) is connected to the emitter of the drive transistor 85 and the other end of each of the sub-pixels 51R is connected to a power line 87 by way of a resistor 86 for setting the operating point. Accordingly, each sub-pixel 51R emits light according to the pulse width of the input image signal, whereby exposure of the photosensitive material 65 is controlled according to the line data DL, that is, the image data DF. As the drive transistor 85, a drive IC for known thermal heads may be employed. The drive circuits 74G and 74B drive the sub-pixels 51G and 51B in the same manner.

After one-line exposure is thus performed, the sub-scanning mechanism 64 conveys the photosensitive material 65 in the sub-scanning direction Y by a predetermined amount. These steps are repeated until the photosensitive material 65 is exposed according to the whole image data D.

By producing a color printer by the use of an exposure head having a plurality of sub-pixels (organic EL elements) which emit light in different colors and linearly arranged by colors, a large light scanning system for scanning light beams in the main scanning direction becomes unnecessary, and a very small and inexpensive color printer can be realized. When the sub-pixels are able to emit light at a high brightness, the printing speed can be increased.

The multi color light emitting head 50 will be described in more detail with reference to FIGS. 12 to 15, hereinbelow.

Figure 12:
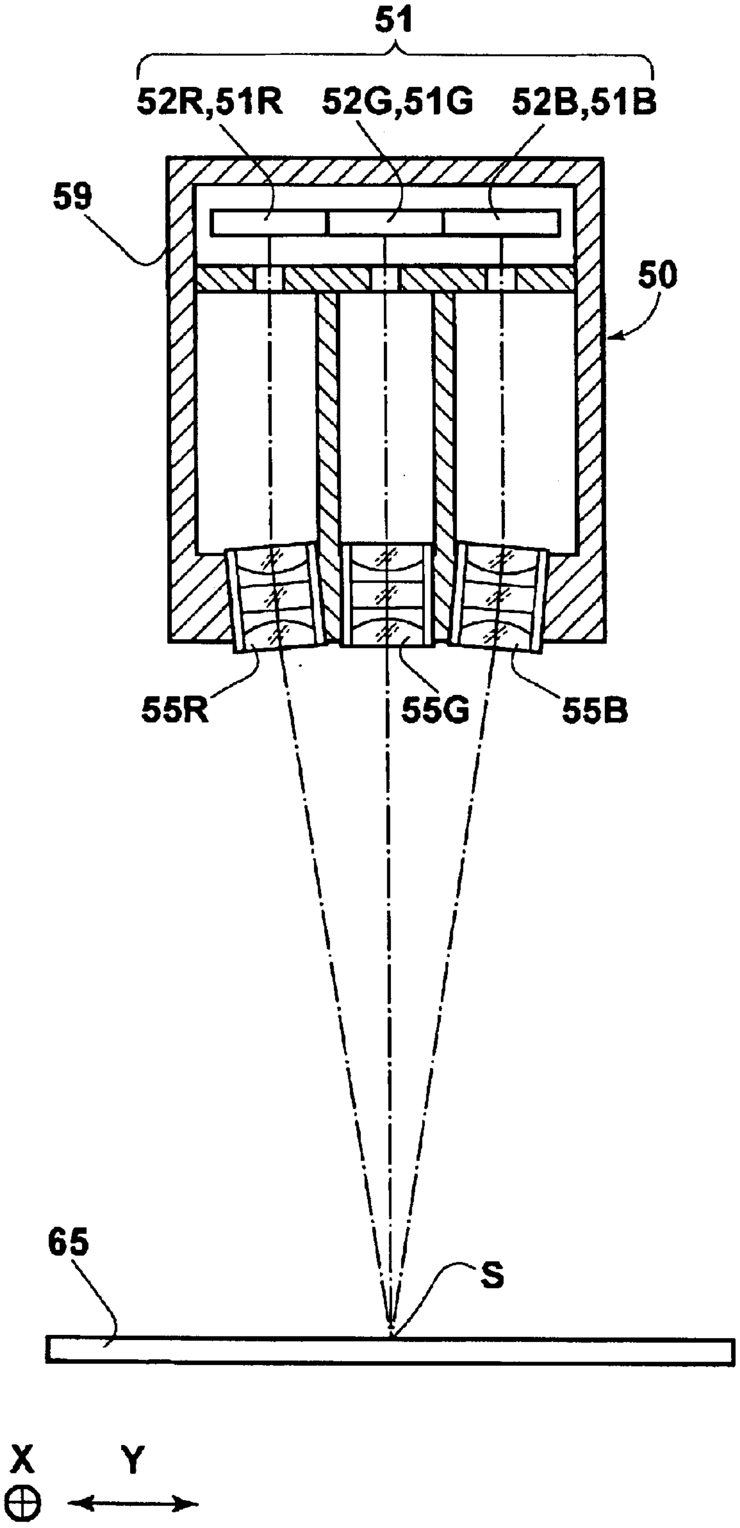
FIG. 12 is a cross-sectional view of the multi color light emitting head.

As shown in FIG. 12, the organic EL element unit 51 and the biaxial optical element arrays 55R, 55G and 55B are housed in a casing 59. As described above, the organic EL element unit 51 comprises a red-region organic EL element array 52R consisting of a plurality of red-region organic EL elements 51R arranged in the main scanning direction X, a green-region organic EL element array 52G consisting of a plurality of green-region organic EL elements 51G arranged in the main scanning direction X and a blue-region organic EL element array 52B consisting of a plurality of blue-region organic EL elements 51B arranged in the main scanning direction X. Each of the arrays 52R, 52G and 52B extends in the main scanning direction X and the arrays 52R, 52G and 52B are arranged in the sub-scanning direction Y in which the color photosensitive material 65 is conveyed.

The biaxial optical element arrays 55R, 55G and 55B respectively image lights emitted from the sub-pixels 51R, 51G and 51B on the color photosensitive material 65. The biaxial optical element arrays 55R, 55G and 55B are arranged so that the red, green and blue lights emitted from the sub-pixels 51R, 51G and 51B forming one pixel are focused in a linear area S on the color photosensitive material 65. That is, the central biaxial optical element 55G is held vertical and the biaxial optical elements 55R and 55B on opposite sides of the optical element 55G are inclined with respect to the vertical. Various biaxial optical systems as described above in conjunction with the first embodiment may be employed also in the second embodiment.

Band pass filters may be provided between the red EL element array 52R and the biaxial optical element 55R, between the green EL element array 52G and the biaxial optical element 55G and between the blue EL element array 52B and the biaxial optical element 55B, if necessary. The bad pass filter makes smaller the half width of the emission spectrum of the organic EL elements and suppresses mixing of different colors upon exposure of the color photosensitive material, thereby improving color reproduction of the image obtained.

The sub-pixels 51R of the red-region organic EL element array 52R are organic EL elements the peak wavelength of the emission spectrum of which is in the region of 600 nm to 740 nm (referred to as "red region" for the purpose of simplicity) and preferably in the region of 610 nm to 720 nm. The sub-pixels 51G of the green-region organic EL element array 52G are organic EL elements the peak wavelength of the emission spectrum of which is in the region of 500 nm to 600 nm (referred to as "green region" for the purpose of simplicity) and preferably in the region of 510 nm to 590 nm. The sub-pixels 51B of the blue-region organic EL element array 52B are organic EL elements the peak wavelength of the emission spectrum of which is in the region of 380 nm to 500 nm (referred to as "blue region" for the purpose of simplicity) and preferably in the region of 400 nm to 490 nm. It is preferred that the sub-pixels 51R, 51G and 51B be different from each other in the peak wavelength of the emission spectrum by 50 nm or more.

The half width of the emission spectrum is important in the sub-pixels 51G (500 nm to 600 nm in peak wavelength) of the green-region organic EL element array 52G positioned between the red-region organic EL element array 52R and the blue-region organic EL element array 52B and preferably not wider than 80 nm. The half width of the emission spectrum is not so important in the sub-pixels 51R (600 nm to 740 nm in peak wavelength) of the red-region organic EL element array 52R or the sub-pixels 51B (380 nm to 500 nm in peak wavelength) of the blue-region organic EL element array 52B and may be, for instance, 150 nm when the peak wavelength is either 680 nm or 410 nm.

The organic EL element is preferably formed, for instance, by forming a transparent electrode (anode) such as of tin oxide, indium tin oxide (ITO), indium zinc oxide or the like on a transparent substrate, forming at least one organic compound layer including a light emitting layer (preferably 10 nm to 1 $\mu$m in total thickness of the organic compound layers) on the transparent electrode, and forming a cathode such as of Mg—Ag, Al, Li—Al, Ca or the like on the organic compound layer. Otherwise, the organic EL element may be formed by first forming a cathode on a substrate, forming at least one organic compound layer including a light emitting layer on the cathode, and then forming a transparent electrode on the organic compound layer. In this case, the substrate need not be transparent and may be of glass fiber or composite material containing therein ceramics.

Figure 13A:
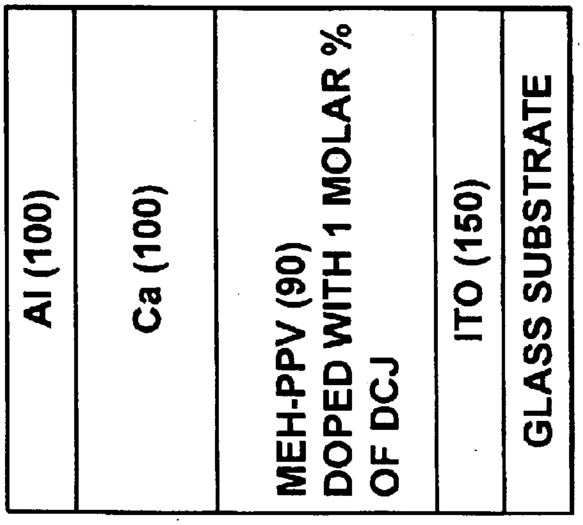
FIGS. 13A to 13C are schematic views showing typical layer arrangements of the organic EL element.
Figure 13B:
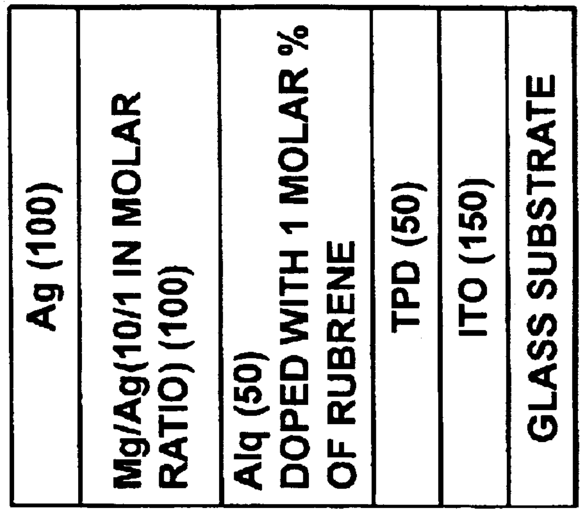
Figure 13C:
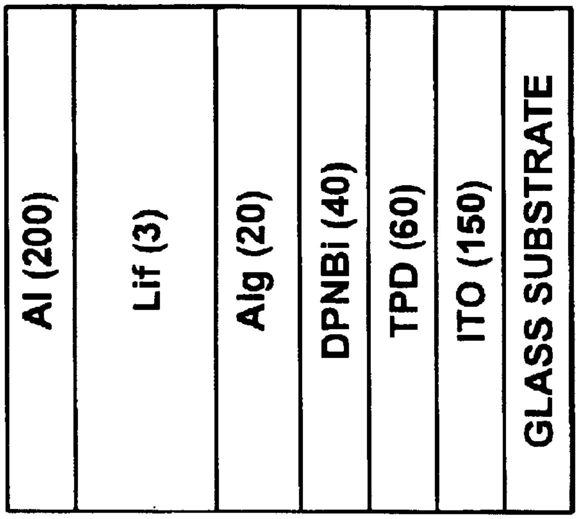

For example, the organic EL element may comprise an anode, a hole-transfer layer, a light emitting layer and a cathode; an anode, a light emitting layer, an electron-transfer layer and a cathode; an anode, a hole-transfer layer, a light emitting layer, an electron-transfer layer and a cathode; or an anode, a light emitting layer and a cathode; superposed one on another in this order or in the reverse order. A plurality of light emitting layers, a plurality of hole-transfer layers and/or a plurality of electron-transfer layers may be formed. Further, a hole-injection layer and/or an electron-injection layer may be added. FIGS. 13A to 13C show typical layer arrangements of the organic EL element.

A conductive polymer layer may be provided between the anode and the hole-transfer layer (or the light emitting layer in the case where no hole-transfer layer is provided) to be in contact with the anode. By providing such a conductive polymer layer, the thickness of the organic material layer can be increased without substantially increasing the drive voltage, whereby occurrence of nonuniformity in brightness and/or short-circuiting can be suppressed.

The conductive polymer is preferably a polyaniline derivative, a polythiophene derivative, or a polypyrrole derivative as disclosed, for instance, in WO-98/05187. These derivatives may be used in the form of a mixture in a protonic acid such as camphor-sulfonic acid, p-toluensulfonic acid, styrenesulfonic acid, or ploystyrene-sulfonic acid. Further, these derivatives may be used in the form of a mixture with other polymer or polymers such as polymethyl methacrylate (PMMA) or polyvinyl carbazole (PVCz), if necessary. It is preferred that the conductive polymer layer be not higher than 10000 Ω in surface resistivity. Further, the thickness of the conductive polymer layer is preferably 10 to 1000 nm, and more preferably 20 to 200 nm.

The light emitting layer maybe an electron-transferring light emitting layer or a hole-transferring light emitting layer so long as it contains therein at least one kind of light emitting material.

The light emitting material may be any so long as it can generate fluorescence when excited and may be, for instance, an oxide compound, a perylene compound, a coumarin compound, an azacoumarin compound, an oxazole compound, an oxadiazole compound, a perinone compound, a pyrrolopyrrole compound, a naphthalene compound, an anthracene compound, a fluorene compound, a fluoranthene compound, a tetracene compound, a pyrene compound, a coronene compound, a quinoline or azaquinolone compound, a pyrazoline- or pyrazolone-derivative, a Rohdamine compound, a chrysene compound, a phenanthrene compound, a cyclopentadiene compound, a stilbene compound, a diphenyl quinone compound, a styryl compound, a distyryl benzene compound, a butadiene compound, a dicyanomethylenepyran compound, a dicyanomethylenethiopyran compound, a fluorescein compound, a pyrylium compound, a thiapyrylium compound, a selenopyrylium compound, a tellurupyrylium compound, an aromatic aldadiene compound, an oligophenylene compound, a xanthene or thioxanthene compound, a cyanine compound, an acridine compound, an acridone compound, a quinoline compound, a metal complex of an 8-hydroxyquinoline compound, a benzoquinolinol-beryllium complex, a metal complex of a 2,2'-bipyridine compound, a complex of a Schiff salt and a III-group metal, a metal complex of an oxadiazole compound or a rare earth metal complex.

These light emitting materials may be used alone or in combination. Further, these light emitting materials may be molecular-dispersed in a carrier-transferring polymer or may be molecular-dispersed in a carrier-non-transferring polymer together with a low-molecular carrier-transferring agent.

Preferably the light emitting material is high-molecular. As the high-molecular light emitting material, there have been known, for instance, a polymer into the main chain and/or a branched chain of which is introduced a low-molecular pigment and tetraphenyldiamine (or triphenylamine) as well as a π-conjugated system of a poly-p-phenylenevinylene derivative, a polyfluorene derivative, a polythiophene derivative or the like. Further, the light emitting material may be a mixture of a high-molecular light emitting material and a low-molecular light emitting material.

The electron-transferring polymer is a polymer which has an electron-accepting group in its branched chain or main chain, and the hole-transferring polymer is a polymer which has an electron-donating group in its branched chain or main chain. The carrier-non-transferring polymer means a polymer such as polymethyl methacrylate, polymethyl acrylate, polystyrene, polycarbonate or the like which is electrically inactive. The low-molecular carrier-transferring agent molecular-dispersed in the carrier-non-transferring polymer together with the aforesaid light emitting material is a low-molecular material which is electron-transferring (electron-accepting) or hole-transferring (electron-donating).

As the electron-transferring compound, may be used, for instance, an oxadiazole derivative, a triazole derivative, a triazine derivative, a nitro-substituted fluorenone derivative, a thiopyrandioxide derivative, a diphenyl quinone derivative, a perylenetetracarboxyl derivative, an anthraquinonedimethane derivative, an anthrone derivative, a perinone derivative, an oxine derivative, a quinoline complex derivative or the like. As the hole-transferring compound, may be used, for instance, a polymer such as a poly-N-vinylcarbazole or polyphenylen vinylene derivative, polyphenylen, polythiophene, polymethylphenylsilane, polyaniline or the like, or a triazole derivative, an oxadiazole derivative, an imidazole derivative, a polyallylalkane derivative, a pyrazoline- or pyrazolone-derivative, a phenylenediamine derivative, an allylamine derivative, an amino-substituted chalcone derivative, an oxazole derivative, a carbazole derivative, a styrilanthracene derivative, a fluorenone derivative, a hydrazone derivative, a stilbene derivative, phthalocyanine, an aromatic tertiary amine compound, a styryl amine compound, a butadiene compound, a benzidine derivative, a polystyrene derivative, a triphenylmethane derivative, a star-burst polyamine derivative.

The organic compound layer such as the hole-transfer layer, the electron-transfer layer, the light emitting layer and the conductive polymer layer may be formed by a known technique such as vacuum deposition, sputtering, dipping, spin coating, casting, bar-coating, roll-coating or the like. Such an organic compound layer may be coated in multiple layers by using different solvents.

The aforesaid cathode is formed over the electron-transfer layer. The cathode may be formed over the electron-transfer layer with a thin (about 0.01 to 10 nm thick) film of aluminum oxide or lithium fluoride intervening therebetween. A protective layer for shielding the cathode from air and/or humidity may be provided on the surface (the side of the cathode remote from the electron-transfer layer) of the cathode. Such a protective layer is disclosed, for instance, in Japanese Unexamined Patent Publication No. 7(1995)-85974. It is preferred that the cathode be sealed with glass or polychlorotrifluoroethylene sheet. Drying agent and/or water repellant fluorine inactive liquid may be introduced inside the seal.

The inorganic layer such as the transparent electrode (anode) or the cathode may be formed by a known technique such as vacuum deposition, sputtering or ion-plating.

The typical layer arrangements of the organic EL element shown in FIGS. 13A to 13C will be described in detail, hereinbelow. FIGS. 13A to 13C respectively show the typical layer arrangements of the red-region organic EL element, the green-region organic EL element and the blue-region organic EL element. The figure in the bracket in FIGS. 13A to 13C represents the thickness of each layer in nm. In FIGS. 13A to 13C, DCJ is an abbreviation of 4-(dicyanomethylene)-2-methyl-6-vinylene-4-pyran, MEH-PPV is an abbreviation of poly (2-methoxy-5-2'-ethylhexyloxy-1,4-phenylenevinylene, Alq is an abbreviation of quinolinol-aluminum complex, TPD is an abbreviation of N,N'-diphenyl-N,N'-bis(3-methylphenyl)(1,1'-biphenyl)-4,4'-diamine, and DPNBi is an abbreviation of 4,4'-bis(2,2-diphenylvinyl)biphenyl.

Further, organic EL elements having a micro cavity structure are preferable in that they are small in the half width of the emission spectrum and excellent in directivity. The organic EL elements having a micro cavity structure are disclosed, for instance, in "Organic EL Display", p105 of an October extra number of "Monthly Display '98" (Techno-Times). In the document, a dielectric mirror, a transparent electrode (an anode), an at least one organic compound layer including therein a light emitting layer, and a back electrode (a cathode) functioning as a metal mirror are formed in this order on a transparent substrate and a micro optical resonator is formed between the dielectric mirror and the back electrode. The dielectric mirror is generally comprises $SiO_2$ and $TiO_2$ layers of 1/4 wavelength alternately superposed one on another. An $SiO_2$ spacer may be inserted between the transparent electrode (e.g., ITO) and the dielectric mirror to adjust the thickness of the element.

As the transparent substrate, a plastic substrate may be used as well as a typical glass substrate. The plastic substrate should be excellent in heat resistance, dimensional stability, resistance to solvent attack, electrical insulating quality, processing characteristics, low air-permeability and low hygroscopicity, and may be of polyethylene terephthalate, polybutylene terephthalate, polyethylene naphthalate, polystyrene, polycarbonate, polyether sulfone, polyallylate, allyl diglycolcarbonate, polyimide, or the like. It is preferred that a water vapor barrier layer (gas barrier layer) be provided on the front side and/or the back side (the side remote from the electrode). As the water vapor barrier layer, a layer of inorganic material such as silicon nitride or silicon oxide is preferable. Such a layer can be formed, for instance, by high-frequency sputtering. If desired, a hard-coat layer and/or an undercoating layer may be provided.

The electrode (especially, the transparent electrode) may be patterned by chemical etching such as photolithography or physical etching using a laser beam. Otherwise, the electrode may be patterned by vacuum deposition or sputtering using a mask.

It is preferred that the organic EL elements be used in the form of a dot array comprising a plurality of organic EL elements arranged in a plurality of rows for each color though may be used as one pixel. Each color may be either of one line or a plurality of lines. The size of one pixel is preferably 10 to 500 $\mu$m, and more preferably 50 to 300 $\mu$m.

In the second embodiment, the size of one pixel of the organic EL elements is 90 $\mu$m×90 $\mu$m, and the pixels are arranged at intervals of 10 $\mu$m to form an organic EL element array. The organic EL element arrays are arranged at intervals of 100 $\mu$m. The size of one pixel of the organic EL elements may be set according to the size of image to be printed and/or the processability which depends upon the aforesaid method of forming the organic EL elements. Since the organic EL elements are in the form of a very thin film and requires no circuit board having a thickness, the light emitting element array can be smaller in thickness as compared with the conventional light emitting element array comprising a plurality of micro LEDs. Further, unlike an LCD or a fluorescent display tube, it is not necessary to provide color filters, the size and the thickness of the apparatus using such a light emitting element array can be smaller.

In the case of the organic EL element, the amount of emitted light is uniform over the light emitting face, and, accordingly, the distribution of the light amount is uniformed over the organic EL element array, whereby an excellent image free from nonuniformity of colors over the entire area of the frame can be formed. Further, since the organic EL element develops color at a speed greatly higher than a micro LCD, the printing speed can be increased.

Figure 14:
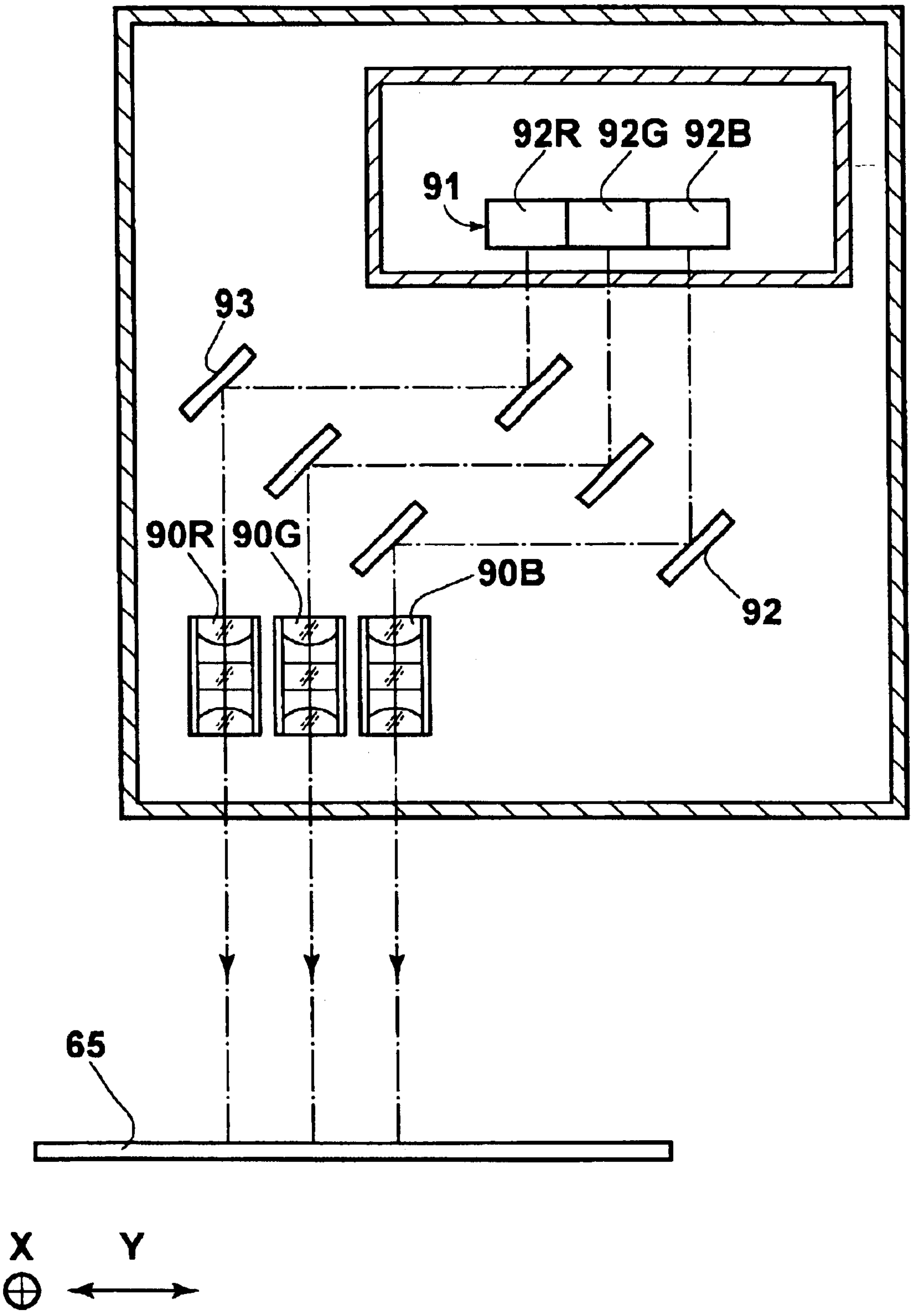
FIG. 14 is a cross-sectional view showing a modification of the multi color light emitting head.

Though, in the imaging optical system of the second embodiment described above, the biaxial imaging optical systems 55R and 55B on opposite sides of the biaxial imaging optical system 55G are inclined so that the red, green and blue lights are focused in a line, an imaging optical system shown in FIG. 14 where biaxial optical systems 90R, 90G and 90B are arranged in the sub-scanning direction Y so that their optical axes are in parallel to each other may be used so that the red, green and blue lights are focused in different three lines on the color photosensitive material 65. In FIG. 14, reference numeral 91 denotes an organic EL element array and reference numerals 92 and 93 denote mirrors. In this case, image data corresponding to each color line is input into each of organic EL element arrays 92R, 92G and 92B.

The exposure of each pixel to different color lights may be controlled by changing the amount of light emitted from the organic EL element per unit time or by changing both the amount of light emitted from the organic EL element per unit time and the light emitting time as well as changing the light emitting time.

What is claimed is:

1. An image recording apparatus which comprises a plurality of light emitting elements arranged in a main scanning direction and an imaging optical system which images light emitted from the light emitting elements on a two-dimensional recording medium in a linearly arranged fashion and in which a two-dimensional image is recorded on the two-dimensional recording medium by imaging light emitted from the respective light emitting elements, the intensity of light emitted from the respective light emitting elements being modulated according to the image to be recorded, through the imaging optical system while moving the two-dimensional recording medium in a sub-scanning direction relatively to the imaging optical system, wherein the improvement comprises that the imaging optical system comprises a first optical system comprising a plurality of biaxial optical elements, each having a refractive index profile in the main scanning direction and a refractive index in a direction perpendicular to the main scanning direction, arranged in the main scanning direction, and a second optical system comprising an optical element disposed on the light incident side of the first optical system or on each of the light incident side and the imaging side of the first optical system and having a refractive power to light components propagated in a direction perpendicular to the main scanning direction but no refractive power to light components propagated in the main scanning direction.

2. An image recording apparatus as defined in claim 1 in which the imaging optical system is an optical system which images light emitted from the light emitting elements as an erected image in an unit magnification on the two-dimensional recording medium.

3. An image recording apparatus as defined in claim 2 in which the first and second optical systems are formed integrally with each other.

4. An image recording apparatus as defined in claim 1 in which the first and second optical systems are formed integrally with each other.

5. An image recording apparatus as defined in claim 1 in which the two-dimensional recording medium is a heat-developing film.

6. An image recording apparatus as defined in claim 2 in which the two-dimensional recording medium is a heat-developing film.

7. An image recording apparatus as defined in claim 3 in which the two-dimensional recording medium is a heat-developing film.

8. An image recording apparatus as defined in claim 4 in which the two-dimensional recording medium is a heat-developing film.

9. An image recording apparatus as defined in claim 1 in which the light emitting element is selected from the group consisting of an LED element, an LD element and an organic EL element.

10. An image recording apparatus as defined in claim 2 in which the light emitting element is selected from the group consisting of an LED element, an LD element and an organic EL element.

11. An image recording apparatus as defined in claim 3 in which the light emitting element is selected from the group consisting of an LED element, an LD element and an organic EL element.

12. An image recording apparatus as defined in claim 4 in which the light emitting element is selected from the group consisting of an LED element, an LD element and an organic EL element.

13. An image recording apparatus as defined in claim 5 in which the light emitting element is selected from the group consisting of an LED element, an LD element and an organic EL element.

14. An image recording apparatus as defined in claim 6 in which the light emitting element is selected from the group consisting of an LED element, an LD element and an organic EL element.

15. An image recording apparatus as defined in claim 7 in which the light emitting element is selected from the group consisting of an LED element, an LD element and an organic EL element.

16. An image recording apparatus as defined in claim 8 in which the light emitting element is selected from the group consisting of an LED element, an LD element and an organic EL element.

* * * * *